United States Patent
Banyay et al.

(10) Patent No.: US 10,823,963 B2
(45) Date of Patent: Nov. 3, 2020

(54) HEAD-UP DISPLAY SYSTEM FOR A VEHICLE

(71) Applicant: Ford Global Technologies, LLC, Dearborn, MI (US)

(72) Inventors: Matus Banyay, Frechen (DE); Anthony Gerald King, Ann Arbor, MI (US); Marcus Haefner, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/557,454

(22) Filed: Aug. 30, 2019

(65) Prior Publication Data

US 2020/0073121 A1 Mar. 5, 2020

(30) Foreign Application Priority Data

Aug. 30, 2018 (DE) .......................... 10 2018 214 766

(51) Int. Cl.
*G02B 27/01* (2006.01)
*G09G 5/36* (2006.01)
(Continued)

(52) U.S. Cl.
CPC ............ *G02B 27/0101* (2013.01); *B60J 1/02* (2013.01); *B60K 35/00* (2013.01); *G09G 5/36* (2013.01);
(Continued)

(58) Field of Classification Search
CPC ............ G02B 27/0101; G02B 27/0018; G02B 5/3066; G02B 2027/0121;
(Continued)

(56) References Cited

U.S. PATENT DOCUMENTS 6,042,947 A * 3/2000 Asakura ............ B32B 17/10018
428/430
9,044,919 B2 * 6/2015 Offermann ............ B32B 37/182
(Continued)

FOREIGN PATENT DOCUMENTS

JP  2013-127489 A   6/2013
WO  2013/190959 A1  12/2013

OTHER PUBLICATIONS

Search Report issued in German Application No. 102018214766.3, dated Apr. 18, 2019 (9 pages).

*Primary Examiner* — Christopher E Leiby
(74) *Attorney, Agent, or Firm* — Frank Lollo; Eversheds Sutherland (US) LLP

(57) ABSTRACT

The invention relates to a head-up display system, in particular in the form of a head-up display system for displaying graphical elements on the windshield (2) of a motor vehicle, with a projection unit (7) arranged in the area of the front vehicle dashboard (5) of the motor vehicle, which is configured to emit preferably p-polarized light rays (28) preferably in the direction of a part of the windshield (2) providing a projection surface (8), wherein the windshield (2) is configured to reflect the light rays emitted by the projection unit (7). To enable a flexible adjustability of the reflection angle of the light rays incident on the windshield, to prevent the occurrence of the "ghost" effect and to ensure a cost-effective production of the head-up display system and of the windshield, a nanostructure (30) formed of structural elements (32) is provided at least in the part of the windshield (2) providing the projection surface (8), wherein the structural elements (32) are inclined at an angle of inclination ($\gamma$) in relation to a surface normal (N) of the windshield (2).

16 Claims, 3 Drawing Sheets

Figure 1:
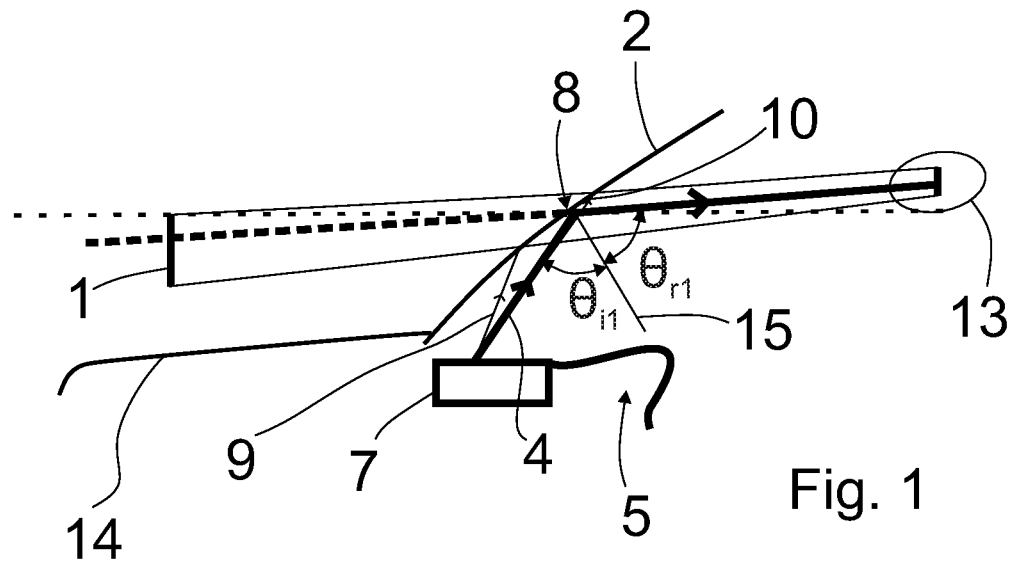

(51) Int. Cl.
  *B60K 35/00*    (2006.01)
  *B60J 1/02*     (2006.01)
(52) U.S. Cl.
  CPC .. *B60K 2370/1529* (2019.05); *B60K 2370/31* (2019.05); *B60K 2370/334* (2019.05); *G09G 2354/00* (2013.01)
(58) Field of Classification Search
  CPC .... G02B 2027/0194; B60J 1/02; B60K 35/00; B60K 2370/334; B60K 2370/1529; B60K 2370/31; G09G 2354/00
  See application file for complete search history.

(56) References Cited

U.S. PATENT DOCUMENTS

| | | | |
|---|---|---|---|
| 2009/0316262 A1 | 12/2009 | Kittaka et al. | |
| 2014/0272386 A1* | 9/2014 | Kiyoto | C03C 17/366 428/328 |
| 2017/0242247 A1 | 8/2017 | Tso et al. | |
| 2019/0012033 A1* | 1/2019 | Brandao Salgado | G06F 3/0412 |
| 2019/0030856 A1* | 1/2019 | Hayasaki | B60K 35/00 |
| 2019/0047379 A1* | 2/2019 | Meller | B60R 11/00 |

* cited by examiner

HEAD-UP DISPLAY SYSTEM FOR A VEHICLE

CROSS-REFERENCE TO RELATED APPLICATIONS

This application claims priority to and the benefit of German patent application No. 102018214766.3, filed Aug. 30, 2018, which is hereby incorporated by reference herein in its entirety.

The invention relates to a head-up display system, in particular in the form of a head-up display system for the display of graphical elements on the windshield of a motor vehicle, with a projection unit which is mounted in the area of the front vehicle fittings of the motor vehicle and configured to emit preferably p-polarized rays of light in the direction of a sub-region of the windshield which provides a projection surface, wherein the windshield is configured to reflect the light rays emitted by the projection unit and wherein the windshield is assembled from an outer glass plate facing towards the vehicle exterior, an inner glass plate facing the vehicle interior, and a plastic intermediate layer arranged between the outer and inner glass plate.

In addition, the invention relates to a windshield as a component of a head-up display system for a motor vehicle.

Field-of-view display devices in the form of head-up displays (HUD) are well known from the prior art. Such a HUD system allows virtual images or graphical elements to be displayed to the driver of a motor vehicle at a comfortable visual distance. To achieve this the head-up display device comprises, among other things, a projection unit to project the virtual images or graphical elements onto a projection surface of a windshield. The projection surface displays a virtual image, which is superimposed on the real environment for the driver. The projection is normally carried out in such a way that the driver perceives the virtual image at some distance from the eye, in particular at a certain distance above the front of the vehicle. The virtual image can contain different colors.

The virtual image or the graphical elements can relate to characteristic data for the vehicle operation or the journey. For example, the vehicle speed, the engine speed, the fuel tank or oil level, the range, the tire pressure and/or similar parameters can be displayed. Also, route information derived from a navigation system can be displayed to the driver via the head-up display system.

The display of such information via a HUD system ensures that the driver does not need to turn their gaze away from the road to obtain information, for example towards the vehicle instruments or display instruments arranged in the vehicle dashboard. The dimensions of the virtual image are preferably chosen in such a way that the driver's eyes do not need to re-focus on the virtual image. In particular, it has proved advantageous to adjust the size of the virtual image to the actual perceived image of the road.

Windshields today are usually made of laminated glass. If so, they are preferably assembled from two glass layers and at least one intermediate plastic layer arranged between the glass layers. The material often used as the intermediate layer is polyvinyl butyral (PVB). The intermediate layer, like the glass layers, can have sound-absorbing properties. It can also have an insulating effect at high or low outside temperatures.

When a conventional windshield is used—without adaptation to HUD requirements—in combination with a HUD projector, the driver or observer of the virtual image perceives two separate virtual images, one due to reflection of the light rays emitted by the projection unit at the surface of the windshield facing the vehicle interior, and one due to reflection of the emitted light rays at the surface of the windshield facing the vehicle exterior. The latter image is referred to in the literature as a "ghost image", among other terms. To the observer the images appear with a certain spatial offset, causing the images to overlap and making a clear recognition of the image information more difficult. In order to eliminate the "ghost" effect, the angular separation between the two images must be less than the angular resolution of the human eye.

A widespread means of reducing the "ghost" effect is the introduction of a wedge angle between the outer and inner glass panel of the windshield. This can be achieved, for example, via a varying thickness of the intermediate layer across the width or height of the windshield. Due to the wedge angle, the light rays reflected from the surface of the glass panel facing the vehicle interior and those reflected from the glass surface facing the glass exterior coincide on their route towards the eyes of the observer. As a result, the "ghost image" can be eliminated. The production of windshields fitted with a wedge angle involves relatively high manufacturing costs and high production complexity.

Another means of eliminating a "ghost image" is described in US 2017/0242247 A1. The core idea disclosed there is to operate the HUD system with p-polarized light and to coat the windshield with a polymer film, in which silver nanoparticles are embedded. This exploits the principle that p-polarized light is only weakly reflected at the air-glass interface of the windshield. The reflection takes place almost exclusively on the silver nanoparticles. Any superposition of the two images is thus avoided.

In the production of a motor vehicle with a given shape, size and position of the windshield, as well as a prescribed position of the driver's seat, the possible ways of arranging the projection unit of the HUD system taking account of the optimal alignment of the virtual HUD image in relation to the position of the driver's seat are very limited. Ultimately, the arrangement of the projection unit is defined by the above-mentioned parameters. This leads to a sever limitation in the vehicle design, particularly with a view to the strongly limited options for arranging the projection unit. Alternatively, in the design of a vehicle the desired position of the HUD projection unit can also be specified. But in that case, the windshield must be adapted in terms of its shape, inclination and the wedge angle to suit this.

A further limitation of the freedom of arrangement for the projection unit is derived from the principle of the Fresnel equations, according to which the angle of the incident light rays on the windshield is equal to the angle of the reflected light rays—the angle of incidence therefore corresponds to the reflected angle. A flexible adjustability of the reflected angle would allow vehicle designers increased design freedom.

In summary, it can be observed that a certain component of the light incident on the windshield is reflected at the inside surface of the windshield into the eye of the driver and another component is coupled into the windshield. It should be noted that the reflection behavior depends to a significant degree on the polarization of the incident light.

In view of the above comments, the object of the present invention is to provide a head-up display system and an associated windshield, by virtue of which a flexible adjustability of the reflection angle for the light rays incident on the windshield is enabled, and the occurrence of the "ghost"

effect is prevented. Equally, the object is to provide a cost-effective production of the head-up display system and of the windshield.

This object is achieved with a head-up display system having the features of patent claim 1, and with a windshield having the features of patent claim 14.

The head-up display system according to the invention is preferably a head-up display system for displaying graphical elements on the windshield of a motor vehicle. An integral component of the display system is a projection unit arranged in the area of the front vehicle dashboard fittings of the motor vehicle. This is configured to emit preferably p-polarized light rays in the direction of a sub-region of the windshield providing a projection surface. Likewise, the projection unit can be configured to emit unpolarized light. The windshield is configured to reflect the light rays emitted by the projection unit.

The windshield is assembled from an outer glass plate facing towards the vehicle exterior, an inner glass plate facing the vehicle interior, and a plastic intermediate layer arranged between the outer and inner glass plate. A crucial advantage of the present invention is the fact that in contrast to the windshields known from the prior art and used for these purposes, the plastic intermediate layer does not need to have a wedge-angled shape or a "wedge angle". However, the invention is not limited to such a design of the windshield. Although the construction of the intermediate layer in the shape of a wedge angle is indeed more expensive, a windshield designed in such a way can also be used within the context of the invention.

According to the invention, a nanostructure formed from structural elements is provided, at least in the sub-region of the windshield providing the projection surface. The structural elements are tilted in relation to a surface normal to the windshield by an angle of inclination. In particular, the nanostructure is a nanostructure that refracts the light emitted by the projection unit. As will be discussed at a later point in the context of further advantageous embodiments of the invention, the nanostructure can be formed either directly on the inner or outer glass panel or alternatively, in a film connected to the windshield. For example, the structural elements can be nanostructure elements inserted directly into the inner or outer glass panel by means of an etching process or a laser structuring. In addition, it is conceivable to dope at least one of the glass panels with nanoparticles. Also, a film with nanoparticles embedded in the film can be applied on a surface of the glass panels. By means of such an inclined arrangement of the structural elements, the reflection angle or angle of emergence of the light rays incident on the nanostructure or structural elements can be controlled and adjusted as a function of the angle of inclination of the structural elements. This applies in particular to those light rays incident on the nanostructure, which due to their wavelength oscillate on impact with the structural elements, in particular when nanoparticles are used, in resonance with the so-called plasmons—those electrons located at the surface of the metal nanoparticles. The incoming light rays are thus affected, for example in terms of their intensity, by means of the surface-plasmon resonance.

Ultimately, this effect gives rise to two different types of reflection, namely to a macro-reflection determined by the entire projection surface, which affects in particular those light rays impinging on the glass panels of the windshield, and in addition, to a micro-reflection determined by the structural elements or nanoparticles. The micro-reflection determines the reflection behavior of the, preferably p-polarized, light rays impinging on the nanoparticles. Using the micro-reflection, the angle of emergence of the light rays reflected at the structural elements, such as the nanoparticles, of the film can be adjusted. In this way, the angle of emergence of the rays of light reflected at the film, and thus ultimately the position of the virtual image in the path, can be calculated in advance—that is, before the construction of the vehicle.

In accordance with the invention the light rays emitted by the projection unit are preferably p-polarized light rays. Such p-polarized light rays only undergo a weak reflection on striking the internal glass panel facing the interior of the vehicle. In contrast, at the nanostructure, for example at the film comprising the nanoparticles, the p-polarized light undergoes a strong reflection. As a result, a certain light component of the incident radiation is selectively reflected towards the human eye. In combination with an adjustable angle of inclination of the structural elements, in particular of the nanoparticles, the direction of the reflected p-polarized light, or the reflection or emergence angle—due to the dependence of the inclination angle of the nanoparticles—can be controlled to a certain extent.

If the dimensions and the design of the bodywork and interior of the motor vehicle are already predefined for a car designer—mathematically, these then represent an invariant element—then by application of a nanostructure, for example the film doped with nanoparticles, on the windshield, the designer can implement different possible arrangements of the projection unit in the vehicle fittings, as well as various shapes of windshield. This is because, due to the inclined arrangement of the structural elements such as the nanoparticles in relation to the surface normal of the windshield or the film, different reflection angles of the light, in particular of the p-polarized light, impinging on the structural elements, for example the nanoparticles, are adjustable. Finally, the direction of the reflected light rays can, to a certain extent, be adjusted and adapted to different requirements. In the approach to the vehicle design, the angle of inclination of the nanoparticles can thus represent a variable quantity.

In addition, the weak reflection of the p-polarized light at the internal glass panel causes the p-polarized light reflected at the structural elements, in particular the nanoparticles or the film comprising the nanoparticles, to be primarily reflected towards the human eye. By such a selection of the rays of light incident on the windshield or the projection area, or of the p-polarized light rays striking the structural elements, in particular the nanoparticles, the occurrence of the "ghost" effect is avoided or at least reduced. Since the p-polarized light is only weakly reflected at the glass panel, only a negligible proportion of the light reflected there travels in the direction of the human eye. An overlap of virtual images and an associated offset illusion of two images is thus avoided.

In addition to the head-up display system, the invention also relates to a windshield as a component part of a head-up display system for a motor vehicle, in particular a head-up display system for displaying graphical elements on the windshield, wherein the windshield is configured to reflect light rays, preferably p-polarized light rays, emitted by a projection unit arranged in the region of the front dashboard of the motor vehicle, and wherein the windshield is assembled from an outer glass plate facing towards the vehicle exterior, an inner glass plate facing the vehicle interior, and a plastic intermediate layer arranged between the outer and inner glass plate. According to the invention, the windshield has a nanostructure formed from structural elements, at least in the sub-region of the windshield that provides the projection surface. The structural elements are tilted in relation to a surface normal to the windshield by an angle of inclination. In the case of the design in which the structural elements are formed by nanoparticles embedded in a film, the film can be applied to the inner or outer glass panel. The nanoparticles are thus tilted by an angle of inclination in relation to the surface normal of the film. Because the film is normally applied directly onto the windshield or onto an inner or outer glass panel of the windshield, the contour of the film adapts to the contour of the glass panel and therefore the windshield. Accordingly the surface normal of the film approximately corresponds to the surface normal of the windshield in this area.

Advantageous designs of the invention are described in the dependent claims.

According to one advantageous configuration of the invention the structural elements are provided on the inner or outer glass panel. The structural elements can thus be formed from nanoparticles embedded in the glass. This means, in particular, that the nanoparticles can be embedded directly into the glass material in the production of the inner or outer glass panel, for example, by means of a doping process. In the process the nanoparticles can be aligned according to the desired inclination.

According to a further advantageous configuration of the invention the structural elements can be formed directly on the glass panel, for example by means of a laser structuring or etching process. Other common methods of structuring glass materials can be used to do this, in particular lithographic methods. In this design variant, the glass, in particular the glass surface itself, is structured directly.

According to a further particularly advantageous configuration, the structural elements are formed from nanoparticles, preferably metal nanoparticles, embedded in a film, wherein the film is arranged on a surface of the inner or outer glass plate and the structural elements are inclined in relation to a surface normal of the film. A surface can mean at this point any surface of the inner or outer glass panel, hence the surface of the inner glass panel facing the interior or the plastic intermediate layer, or the surface of the outer glass panel facing the plastic intermediate layer or the vehicle exterior.

According to one advantageous configuration of the invention the film is arranged on a surface of the inner glass panel facing the intermediate layer. The film is then integrated and embedded into the laminated glass. This prevents any contact with air and moisture. Accordingly, air-sensitive or moisture-sensitive nanoparticles can also be embedded in the film and used in the context of the invention, because in such an arrangement the film is arranged inside the laminated glass and not on one of the outer surfaces. The optical reflection properties of the nanoparticles can therefore be fully exploited, while at the same time protecting a durability and adequate level of protection of the nanoparticles from external influences. In addition to the above-mentioned arrangement of the film, this can equally be arranged on a surface of the outer glass layer facing the intermediate layer. Even in this case, the protection against air and moisture is still guaranteed. In principle, even an arrangement of the film in the region of the intermediate layer is possible, for example, in the case in which the intermediate layer is composed of multiple layers. The film can then be arranged between the layers of the intermediate layer.

In a further advantageous design, the film can be laminated, glued or welded onto the inner or outer glass panel. A stable mounting of the film on one of the glass panels, preferably the inner glass panel, is highly relevant to a permanent provision of a stable composite structure of the windshield. Also important is a smooth application of the film avoiding air inclusions, because this can have a negative impact on the reflective properties of the film or the nanoparticles.

According to a further configuration, the plastic intermediate layer can comprise one or more layers of polyvinyl butyral (PVB). PVB is one of the most widely used materials for protective coatings of windshields produced from laminated glass. PVB is a melting adhesive. When a windshield shatters in the event of a crash, the PVB intermediate layer is characterized by its splinter-binding effect. Furthermore, PVB has a relatively high tensile strength. Other functional materials can be integrated into the intermediate layer, such as materials for thermal insulation, acoustic insulation, color tinting, etc. Also, for example, sensors such as rain sensors can be integrated into the intermediate layer.

According to a further advantageous configuration of the invention, the metal nanoparticles can be embedded in a dielectric matrix material of the film. Dielectrics are electrically weakly conducting or non-conducting substances. In particular, non-conductive plastics are suitable as a matrix material for this application. These preferably involve a transparent plastic.

According to a further configuration of the invention the nanostructure, for example in the form of the nanoparticles embedded in the film, can extend over the entire windshield or be arranged in the area of the windshield that provides the projection surface. An arrangement in which the nanostructure extends over the entire windshield can offer advantages in terms of a simplified production of the laminated glass windshield. In this case, one of the glass panels of the windshield can be coated completely with the nanostructure, in particular the film, in a single processing step. The manufacturing step of an accurate positioning of the film in the region that provides the projection surface is then bypassed. Such a design can also be advantageous even when the desired position of the projection surface on the windshield is not yet known. This gives the design engineer of the vehicle increased design freedom. A positionally exact arrangement of a nanostructure, in particular a film, in a region that provides the projection surface, on the other hand, offers advantages in terms of a lower material consumption. The material costs are thereby reduced.

According to a further advantageous configuration the metal nanoparticles can be silver nanoparticles, wherein the nanoparticles preferably have the shape of a disk. The silver nanoparticles can be fine particles of elemental silver. Equally, they may be silver compounds, in particular poorly soluble silver compounds, so-called silver sol. Examples of compounds are silver halides. Use of other metal nanoparticles along with their compounds is also conceivable, for example of gold, platinum, palladium, iron, or cobalt nanoparticles. The nanoparticles can be provided with protective shells and/or functionalized with organic molecules. The nanoparticles can have a wide variety of shapes. In addition to a disk shape, a platelet, prism, rod or ball shape are equally suitable.

According to a further advantageous configuration of the invention some of the light rays that are incident on the projection surface of the windshield under a first angle of incidence are reflected by the surface of the inner glass plate facing the interior of the vehicle under a first angle of reflection. Subsequently, some of the light rays pass through the inner glass panel and after striking the nanostructure, for example in the form of the nanoparticles embedded in the film, under a second angle of incidence are reflected by the nanostructure or the film under a second, adjustable angle of reflection. The second angle of reflection can be adjusted by the use of nanoparticles inclined at different angles. The inclination of the nanoparticles is with reference to a normal vector of the windshield or the surface of the film, the so-called surface normal.

In a particularly advantageous manner, the projection unit is configured to emit exclusively p-polarized light rays. In an even more advantageous manner the nanostructure, for example in the form of the nanoparticles embedded in the film, is configured to reflect exclusively p-polarized light rays. Due to the fact that the p-polarized light rays are reflected more weakly at the surface of the inner glass pane facing the interior of the vehicle than at the nanostructure or film surface, those light rays incident on the surface of the inner glass panel facing the vehicle interior and reflected there are only very weakly reflected, i.e. due to the weak reflection they are only weakly perceived by the viewer or driver or not at all. Instead, for an observer of the displayed graphical elements only the p-polarized light rays reflected at the nanostructure or the surface of the film are perceptible, namely in the form of the displayed graphical elements.

In that case, in which on the basis of the geometry of the beam path of the light rays and the position of the windshield and the position of the driver's seat, a "ghost image" would be expected to appear, the driver perceives—due to the weak reflection of the p-polarized light rays at the air-glass interface—only the light rays that are reflected at the nanostructure or film. The perception of a "ghost image" is thereby eliminated. In this context, a further decisive advantage of the design according to the invention should be mentioned. Due to such a suppression of the ghost effect, it is possible to dispense with wedge-shaped intermediate layers, so-called "wedge-angle" intermediate layers, known from the prior art. This will result in reduced manufacturing costs as well as the cost of the windshield.

A particular advantage of the present invention is the fact that the second reflection angle can be adjusted by means of the angle of inclination of the structural elements, for example the metal nanoparticles, relative to the surface normal of the film by means of a micro-reflection. If the p-polarized light rays impinge on the nanostructure or film, then the reflection or the reflection angle is primarily determined by the angle of incidence of the light rays on the nanostructure or film (Fresnel equations). This can be designated as a macro-reflection, since in this case the reflection is determined by the film as a macroscopic unit, or macroscopic reflection surface. As mentioned above, however, in the context of the vehicle design it may be advantageous to obtain a greater design freedom for the arrangement of the projection unit for a given shape and position of the windshield panels, as well as the driver's position.

In classical windshields the scope for variation for the designer is severely limited, but in the end he/she must adapt the design or arrangement to the reflection properties of the windshield and the pre-defined criteria, for example, the driver's position, the shape and position of the windshield and the circumstances of the vehicle dashboard in the vehicle cockpit. A further degree of freedom in the design would therefore be desirable.

By allowing the option to provide structural elements, for example nanoparticles, in the nanostructure that are inclined in relation to the surface normal of the windshield, or in the case of a design in the form of a film in relation to the surface normal of the film, the reflection of the p-polarized light rays striking the nanostructure or the structural elements can be influenced or modified in comparison to the macro-reflection by the angle of inclination of the structural elements or nanoparticles. The reflection adjustable by inclination of the structural elements or nanoparticles can also be referred to as micro-reflection. Thus, the designer of the vehicle obtains additional design freedom in the implementation of the head-up display system for the possible arrangements and design of the head-up display.

According to a further advantageous configuration of the invention, the second reflection angle of the light rays incident on the nanostructure or the film is adjustable by means of a micro-reflection occurring at the structural elements, for example the metal nanoparticles, as a function of the angle of inclination of the structural elements by 0-10°, preferably by 0.5-3.5°. Therefore, the angle of reflection of the p-polarized light incident on the windshield is ultimately also adjustable. In the case of an angle of incidence and angle of reflection specified by the vehicle design of 20°, for example, the angle of reflection can be adjusted to a value of 15 to 20° via a suitable inclination of the structural elements. In this way, the basic rule of the reflection of radiation whereby the angle of incidence is equal to the angle of reflection, can be bypassed.

The head-up display system underlying the invention as well as the windshield underlying the invention can be combined with all the advantageous embodiments described above, wherein the above-mentioned features may be present individually or in any combination.

In addition, it should be noted that terms such as "comprising" "have" or "with" do not exclude other features or steps. Furthermore, terms such as "a" or "the" which refer to a singular number of steps or features, do not exclude a plurality of features or steps, and vice versa.

Figure 2:
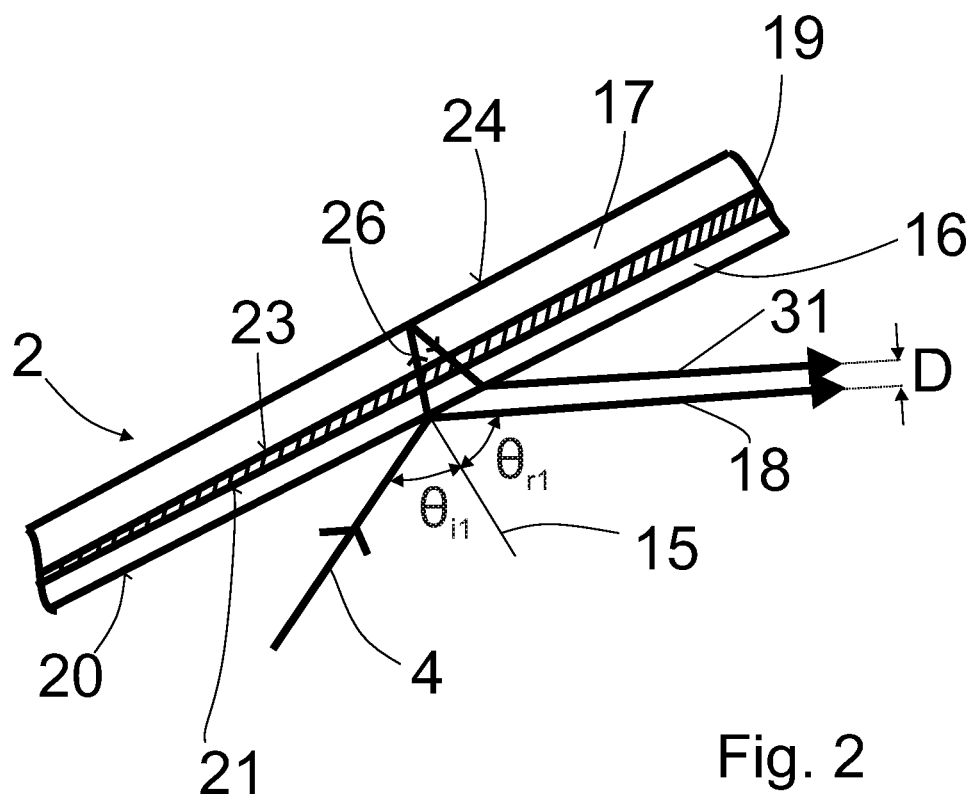
Figure 3:
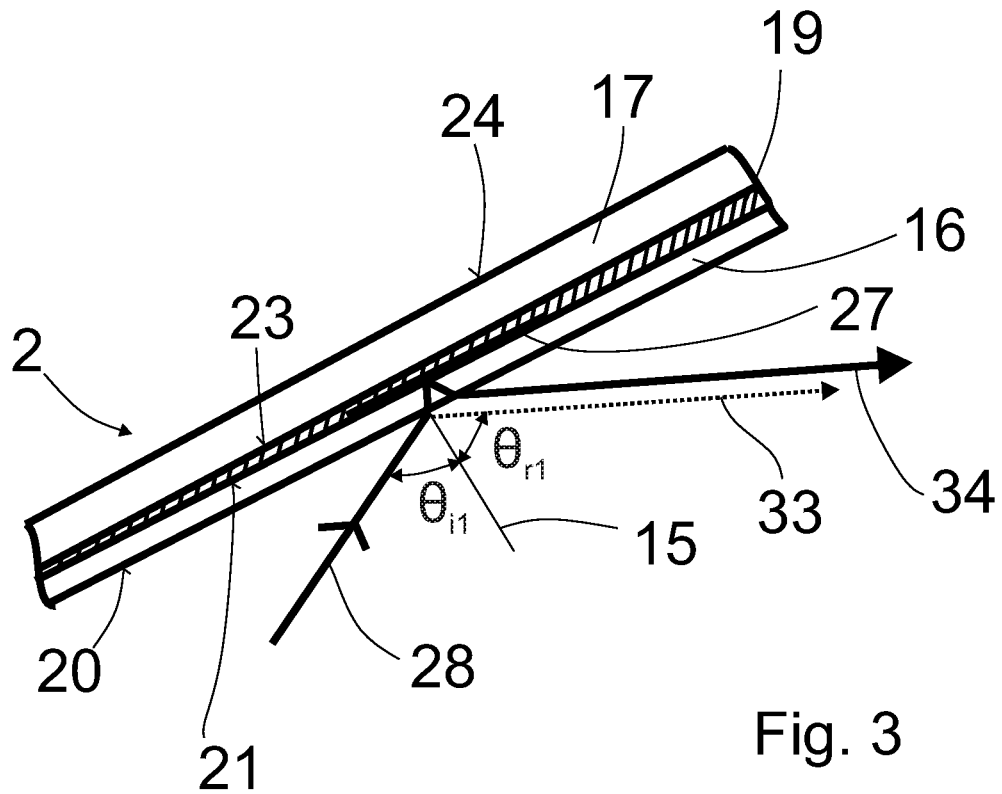
Figure 4:
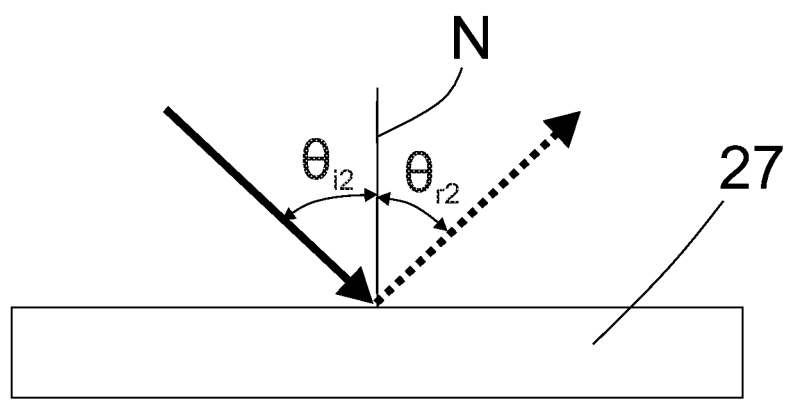
Figure 5:
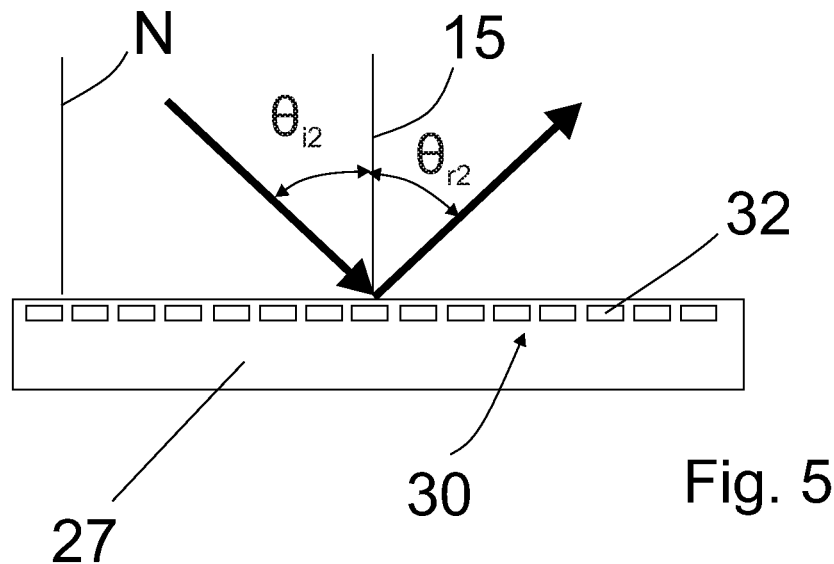
Figure 6:
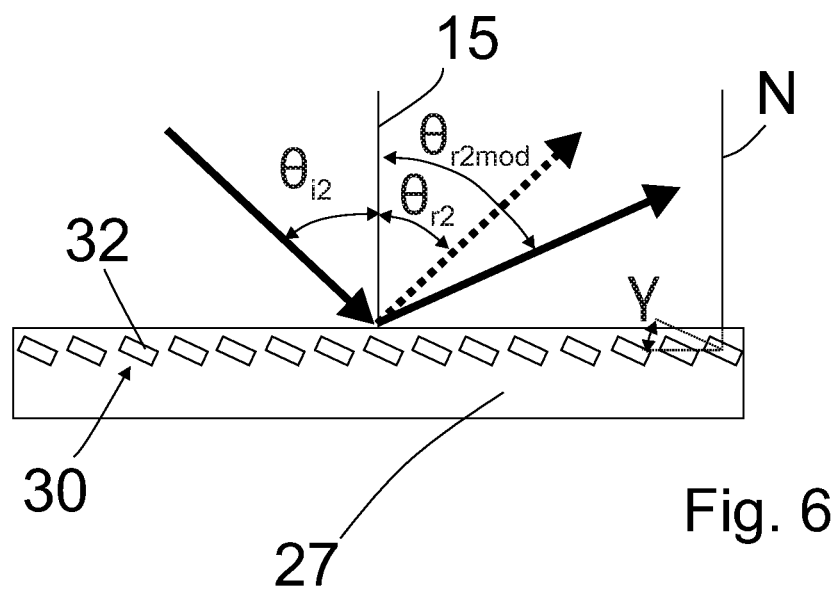

Further advantages of the invention are described on the basis of a plurality of individual aspects of the head-up display system according to the invention and the windshield according to the invention based on appropriate exemplary embodiments. Shown are:

FIG. 1 a schematic drawing of a head-up display system arranged in the vehicle cockpit;

FIG. 2 a schematic illustration of the appearance of a ghost image when using a head-up display system with windshields known from the prior art;

FIG. 3 a schematic illustration of the ray path when using a head-up display system according to the invention or a windshield according to the invention;

FIG. 4 a schematic illustration of the light reflection at an unmodified projection surface of a windshield;

FIG. 5 a schematic illustration of the light reflection at a modified projection surface of a windshield;

FIG. 6 a schematic illustration of the light reflection at a projection surface, modified according to the invention, of a windshield.

FIG. 1 shows the basic structure of a head-up display system or a head-up display (HUD) in a schematic form. Head-up displays are used in the front section of a motor vehicle for the display of virtual images 1. This allows, for example, the travel speed, the fuel tank level, the engine rpm or route-related information to be displayed to the driver. This list is not exhaustive.

A virtual image 1 is displayed in the driver's natural field of view when looking at the road. This prevents the need for drivers to avert their gaze from the road in order to obtain certain display information items, which can reduce the driver's attention in relation to the road traffic and can lead to unwanted hazard situations.

In short, the virtual image 1 is produced by reflection of light rays 4 that are incident on the windshield 2 of the vehicle, which represent an image to be displayed. As shown in FIG. 1, in the region of the front vehicle fittings 5 or in the cockpit of the vehicle, a projection unit 7 is provided for projecting a ray of light 4 onto the windshield 2. The light ray 4 is induced by a radiation source, not shown, and projected by the projection unit 7 in the direction of a projection surface 8 of the windshield 2. The projection unit 7 can comprise one or more projection mirrors.

The light ray 4 strikes the projection surface 8 of the windshield 2 under an angle of incidence $\theta_{i1}$ and is reflected from the windshield 2 under an angle $\theta_{r1}$. It should be noted that the (bulk) light ray 4 shown here is composed of a plurality of individual light rays. As indicated, the size of the displayed image or virtual image is determined by the lower and upper light rays 9, 10. Accordingly the light rays 4, 9, 10 representing the image to be displayed and reflected at the windshield 2 corresponding to the image area 11 are incident on the human eye 13. In extension of the region of the image 11 in the viewing direction of the eye 13 (represented by the thick-dashed projection line), the driver and/or the eye 13 perceives the virtual image 11 as lying outside the vehicle. As illustrated, the driver perceives the virtual image 1 as located above the engine hood 14 of the vehicle.

FIG. 2 illustrates in a highly schematic drawing, how a so-called "ghost image" arises in a HUD system known from the prior art. The figure shows a light ray 4 incident on a windshield 2. The ray of light 4 represents, as already mentioned in relation to FIG. 1, a plurality of individual light rays. The light ray 4 is incident under an angle of incidence $\theta_{i1}$ (in relation to an incidence normal 15) on the windshield 2 and is reflected thereat under an angle of reflection $\theta_{r1}$ (also relative to the incidence normal 15).

As is additionally apparent from FIG. 2, the windshield 2 is composed of a plurality of layers. This is, as shown in the figure, a laminated glass structure with an inner glass panel 16 facing the interior of the vehicle and an outer glass panel 17 facing the vehicle exterior. Between the glass panels 16, 17 a plastic intermediate layer is arranged, for example made of polyvinyl butyral (PVB).

The inner glass panel 16 has a first surface 20 and a second surface 21. The first surface 20 faces the interior of the vehicle and represents an air-glass material interface. Accordingly, the incoming rays of light 4 strike the surface 20 and are at least partially reflected there. The second surface 21 of the inner glass panel 16 faces the intermediate layer 19. The outer glass panel 17 has a first surface 23 which faces the intermediate layer 19. At the same time, the second surface 24 of the outer glass panel 17 represents the material interface between the windshield 2 and the vehicle exterior.

Part of the light 4 incident on the first surface 20 of the inner glass panel 16 is not reflected at the surface 20, but passes through the inner glass panel 16, the intermediate layer 19 and the outer glass panel 17. The light ray directly reflected at the first surface 20 is labeled in FIG. 2 with reference numeral 18. At the second surface 24 of the outer glass panel 17 the ray of light 26 passing through the glass panels 16, 17 and the intermediate layer 19 is reflected. When the reflected light ray 26 is incident on the first surface 20 of the inner glass panel 16, i.e. at the material interface between inner glass panel 16 and the vehicle interior, the light ray 26 is refracted and runs as a refracted light ray 31 in the direction of the observer. Such a double reflection of the incident light at the surfaces 20 and 24 of the windshield 2 creates a virtual image 1 superimposed with a ghost image.

The virtual image 1 and the ghost image are characterized by an image offset corresponding to the spatial offset D of the light rays 18 and 31. The ghost image formation can be reduced by providing a wedge-shaped intermediate layer 19. In the illustrated example, the thickness of the layer 19 increases along the windshield 2 from bottom to top. The production or construction of such a windshield 2 is time-consuming and expensive.

According to the invention one of the glass panels 16, 17 can be provided with a nanostructure 30, wherein the nanostructure 30 has structural elements 32, which are inclined relative to a surface normal N of the windshield 2 by an angle of inclination γ. The nanostructure 30 can be formed in a variety of different ways. For example, it can be incorporated directly into the glass material of the glass panels 16, 17, or comprise doping of the glass panels 16, 17 with structural elements 32 in the form of nanoparticles, or be implemented in the form of nanoparticles embedded in a film 27, wherein the film 27 is applied to a surface 20, 21, 23, 24 of the windshield. In the latter case, the nanoparticles form the structural elements 32. These are inclined in relation to a surface normal N of the film 27 by an angle γ. In the following, purely as an example, reference will be made to the design variant of the structural elements 32 or nanoparticles integrated in a film 27. The comments apply analogously to the other design variants.

As shown in FIG. 3, the inner glass panel 16 can be coated with a film 27 doped with structural elements or nanoparticles 30, in particular, the film 27 can be applied to the second surface 21 of the inner glass panel 16 (an arrangement on another surface 20, 23, 24 is also possible). If the projection unit 7 emits exclusively p-polarized light 28, only a small proportion of the light 28 will be reflected at the surface 20 of the inner glass panel 16, mainly due to the weak reflection of p-polarized light on glass. The weak reflection of the p-polarized light at the glass surface 20 is indicated by the light ray 33 shown as a dotted line. The incident p-polarized light 28 is substantially reflected after its passage through the first glass panel 16 and subsequent incidence on the film 27 or on the structural elements 32 or nanoparticles embedded in the film 27. In addition, on emerging from the first glass panel 16 the light is refracted again and the light ray 34 is deflected in the direction of the observer. Due to the weak reflection of the p-polarized light on glass, the p-polarized light 28, 34 reflected at the film 27 or the structural elements 32 or nanoparticles is mainly transmitted in the direction of the observer. The occurrence of a ghost effect is therefore avoided.

A particularly advantageous feature is that a wedge-shaped design of the intermediate layer 19 to compensate for the ghost effect can be eliminated. Of course, this can nevertheless be provided as well.

As illustrated in FIG. 6, the structural elements 32 or nanoparticles in the film 27 can be inclined relative to the surface normal N by an angle γ. If the light rays (represented by arrows in the figures) are reflected at the inclined structural elements 32 or nanoparticles, the angle of reflection or angle of emergence $\theta_{r2}$ can be changed into a modified angle $\theta_{r2mod}$ by 0-10°, preferably by 0.5-3.5° and may deviate from the angle of incidence $\theta_{i2}$ by this value. In this respect, reference is made in particular to a comparison of FIGS. 5 and 6, which show the change in the reflection angle $\theta_{r2}$ when using inclined structural elements 32 or nanoparticles in comparison to non-inclined structural elements 32 or nanoparticles. This is also illustrated in FIG. 6 (the dashed arrow represents the reflection at non-inclined structural elements 32, or the reflection for the case in which no structural elements 32 are used). In the FIGS. 4-6 the angles of incidence and angles of emergence occurring at the film 27 are indicated by the number 2 and designated by $\theta_{i2}$ and $\theta_{r2}$. FIG. 4 shows the reflection at a surface or film without modification with structural elements 32. If this is a glass surface, for example, the reflection of p-polarized light is weaker than in the case of reflection at a surface modified with structural elements 32. This effect is shown in FIG. 4 by means of a dashed arrow by way of comparison with the arrows showing the reflected light in FIGS. 5 and 6.

Such a modification of the reflection angle allows the designer of the vehicle greater design freedom for the arrangement of the projection unit 7 in the vehicle cockpit.

Also, this allows greater design freedom in the selection of the size and shape of the windshield.

LIST OF REFERENCE NUMERALS 1 virtual image
2 windshield
4 light ray
5 vehicle fitting
7 projection unit
8 projection surface
9 lower light ray
10 upper light ray
11 image area
13 eye
14 engine hood
15 incidence normal
16 inner glass panel
17 outer glass panel
18 light ray
19 plastic intermediate layer
20 first surface
21 second surface
23 first surface
24 second surface
26 light ray
27 film
28 p-polarized light
30 nanostructure
31 light ray
32 structural elements
$\theta_{i1}$ first angle of incidence
$\theta_{r1}$ first angle of reflection
$\theta_{i2}$ second angle of incidence
$\theta_{r2}$ second angle of reflection
$\theta_{r2mod}$ modified second angle of reflection
N surface normal
D offset
γ angle of inclination

The invention claimed is:

1. A head-up display system for displaying graphical elements on a windshield (2) of a motor vehicle, the head-up display system comprising:
a projection unit (7) which is mounted in an area of a front vehicle dashboard (5) of the motor vehicle and configured to emit p-polarized rays of light (28) in a direction of a sub-region of the windshield (2) which provides a projection surface (8),
wherein the windshield (2) is configured to reflect the light rays (28) emitted by the projection unit (7),
wherein the windshield (2) is assembled from an outer glass plate (17) facing towards a vehicle exterior, an inner glass plate (16) facing a vehicle interior, and a plastic intermediate layer (19) arranged between the outer glass plate (17) and inner glass plate, wherein the inner glass plate (16) is in contact with a surface of the plastic intermediate layer (19), and the outer glass plate (17) is in contact with an opposing surface of the plastic intermediate layer (19),
wherein a nanostructure (30) formed of structural elements (32) is provided on a surface (20) facing the vehicle interior of the inner glass plate (16) or a surface (24) facing toward the vehicle exterior of the outer glass plate (17), at least in the sub-region of the windshield (2) which provides the projections surface (8), and
wherein two or more of the structural elements (32) are inclined in relation to a surface normal (N) of the windshield (2) by an angle of inclination (γ).

2. The head-up display system as claimed in claim 1, wherein the structural elements (32) are formed by nanoparticles integrated into the outer glass plate (16) or the inner glass plate (17).

3. The head-up display system as claimed in claim 1, wherein the structural elements (32) are formed directly on the outer glass plate (16) or the inner glass plate (17) by a laser structuring or an etching process.

4. The head-up display system as claimed in claim 1, wherein the structural elements (32) are formed from metal nanoparticles embedded in a film (27), wherein the film is arranged on the surface (20) of the inner glass plate (16) or the surface (24) of the outer glass plate (17) and the structural elements (32) are inclined in relation to a surface normal (N) of the film.

5. The head-up display system as claimed in claim 4, wherein the film (27) is arranged on a surface (21) of the inner glass plate (16) that faces the plastic intermediate layer (19).

6. The head-up display system as claimed in claim 4, wherein the film (27) is laminated, glued, or welded onto the inner glass plate or the outer glass plate (16, 17).

7. The head-up display system as claimed in claim 4, wherein the metal nanoparticles are embedded in a dielectric matrix material of the film (27).

8. The head-up display system as claimed in claim 4, wherein the metal nanoparticles are silver nanoparticles, wherein the nanoparticles have a disk shape.

9. The head-up display system as claimed in claim 1, wherein the light rays (28) that are incident on the projection surface (8) of the windshield (2) under a first angle of incidence ($\theta_{i1}$) are reflected by the surface (20) of the inner glass plate (16) facing the interior of the vehicle under a first angle of reflection ($\theta_{r1}$), and wherein at least some of the light rays pass through the inner glass plate (16) and after striking the nanostructure (30) under a second angle of incidence ($\theta_{i2}$) are reflected by the nanostructure (30) under a second adjustable angle of reflection ($\theta_{r2mod}$).

10. The head-up display system as claimed in claim 1, wherein the nano structure (30) extends over and entirety of the windshield (2) or is arranged in an area of the windshield (2) that provides the projection surface (8).

11. The head-up display system as claimed in claim 1, wherein the projection unit (7) is configured to emit exclusively p-polarized light rays (28) and the nanostructure (30) is configured to reflect exclusively p-polarized light rays (28).

12. The head-up display system as claimed in claim 11, wherein the p-polarized light rays (28) are reflected more weakly at the surface (20) of the inner glass plate (16) facing the interior of the vehicle than at the nano structure (30).

13. The head-up display system as claimed in claim 11, wherein to an observer of the graphical elements only the p-polarized light rays (28) reflected at the nano structure (30) are perceptible.

14. The head-up display system as claimed in claim 9, wherein the second reflection angle ($\theta_{r2mod}$) is configure to be adjusted by the angle of inclination ($\gamma$) of the structural elements (32) relative to the surface normal (N) of the film (27) by a micro-reflection.

15. The head-up display system as claimed in claim 14, wherein the second reflection angle ($\theta_{r2mod}$) of the light rays (28) incident on the nano structure (30) is adjustable by the micro-reflection occurring at the structural elements (32) as a function of the angle of inclination ($\gamma$) of the structural elements (32) by 0-10°.

16. A vehicle comprising:
a windshield as a component of a head-up display system for displaying of graphical elements on the windshield (2); and
a projection unit (7) arranged in an area about a front vehicle dashboard (5) of the vehicle,
wherein the windshield (2) is configured to reflect p-polarized light rays (28) emitted by the projection unit (7),
wherein the windshield (2) is assembled from an outer glass plate (17) facing towards a vehicle exterior, an inner glass plate (16) facing a vehicle interior, and a plastic intermediate layer (19) arranged between the outer glass plate (17) and the inner glass plate, wherein the inner glass plate (16) is in contact with a surface of the plastic intermediate layer (19), and the outer glass plate (17) is in contact with an opposing surface of the plastic intermediate layer (19),
wherein at least in a sub-region of the windshield (2) which provides a projection surface (8), a nanostructure (30) formed of structural elements (32) is provided on a surface (20) facing the vehicle interior of the inner glass plate (16) or a surface (24) facing toward the vehicle exterior of the outer glass plate (17), and
wherein two or more of the structural elements (32) are inclined in relation to a surface normal (N) of the windshield (2) by an angle of inclination ($\gamma$).

\* \* \* \* \*